(12) United States Patent
Kitchaev et al.

(10) Patent No.: US 12,388,092 B2
(45) Date of Patent: Aug. 12, 2025

(54) STABILIZED CATALYST LAYERS VIA CONTROLLED CRACKING

(71) Applicant: Robert Bosch GmbH, Stuttgart (DE)

(72) Inventors: Daniil A. Kitchaev, Brookline, MA (US); Mordechai Kornbluth, Brighton, MA (US); Lei Cheng, San Jose, CA (US); Jonathan Braaten, Sunnyvale, CA (US); Christina Johnston, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 40 days.

(21) Appl. No.: 17/842,346

(22) Filed: Jun. 16, 2022

(65) Prior Publication Data

US 2023/0411637 A1 Dec. 21, 2023

(51) Int. Cl.
*H01M 4/92* (2006.01)
*H01M 4/86* (2006.01)
*H01M 4/88* (2006.01)
*H01M 4/90* (2006.01)

(52) U.S. Cl.
CPC ........ *H01M 4/92* (2013.01); *H01M 4/8631* (2013.01); *H01M 4/8892* (2013.01); *H01M 4/9083* (2013.01)

(58) Field of Classification Search
CPC ........ H01M 4/92; H01M 4/921; H01M 4/925; H01M 4/926; H01M 4/8631; H01M 4/8626; H01M 4/8892; H01M 4/8878; H01M 4/9083; H01M 4/9075
See application file for complete search history.

(56) References Cited

U.S. PATENT DOCUMENTS

| | | | |
|---|---|---|---|
| 7,132,150 B2 | 11/2006 | Ogunwumi et al. | |
| 7,220,514 B2 | 5/2007 | Yasumoto et al. | |
| 2015/0027906 A1* | 1/2015 | Chen | G01N 27/4074 205/780.5 |
| 2021/0020953 A1 | 1/2021 | Martinez Bonastre et al. | |

FOREIGN PATENT DOCUMENTS

| | | |
|---|---|---|
| KR | 100659133 B1 | 12/2006 |
| KR | 101664721 B1 | 10/2016 |
| WO | 2022071321 A1 | 4/2022 |

OTHER PUBLICATIONS

Louw, Stefan, and David Jones. "Pavement Recycling: Literature Review on Shrinkage Crack Mitigation in Cement-Stabilized Pavement Layers." (2015).

(Continued)

*Primary Examiner* — Raymond Alejandro
(74) *Attorney, Agent, or Firm* — Brooks Kushman P.C.

(57) ABSTRACT

Microcracked and crack-free catalyst layers such as for electrodes in electrochemical cells (e.g., fuel cells) and method of making the same are disclosed. The microcracks may improve durability by better tolerating stresses without inducing or propagating into macrocracks. The microcracks also improve efficiency by providing reactant (e.g., oxygen) passages to catalyst in the catalyst layer. The microcracks may be formed in a predetermined pattern to further localize additional reactant passages is conventionally starved or more starved locations.

19 Claims, 5 Drawing Sheets

(56) References Cited

OTHER PUBLICATIONS

Singh, Yadvinder, et al. "Mitigation of mechanical membrane degradation in fuel cells by controlling electrode morphology: a 4D in situ structural characterization." Journal of The Electrochemical Society 168.3 (2021): 034521.

Kim, Y. S., et al. "Highly durable fuel cell electrodes based on ionomers dispersed in glycerol." Physical Chemistry Chemical Physics 16.13 (2014): 5927-5932.

Braaten, Jonathan P. Understanding Catalyst Layer Morphologies and Degradation and their Impact on Critical Oxygen Transport in PEMFC Cathodes. Diss. Carnegie Mellon University, 2021.

Braaten, Jonathan P., et al. "Integration of a high oxygen permeability ionomer into polymer electrolyte membrane fuel cell cathodes for high efficiency and power density." Journal of Power Sources 522 (2022): 230821.

Kim, Youn Soo, et al. "Insight into the Origin of the Positive Effects of Imidazolium Salt on Electrocatalytic Activity: Ionic Carbon Nanotubes as Metal-Free Electrocatalysts for Oxygen Reduction Reaction." Chemistry-An Asian Journal 8.1 (2013): 232-237.

Sezer, Nurettin, and Muammer Koç. "Oxidative acid treatment of carbon nanotubes." Surfaces and Interfaces 14 (2019): 1-8.

Ohira, A., Kuroda, S. Mohamed, H.F., & Tavernier, B "Effect of interface on surface morphology and proton conduction of polymer electrolyte thin films. "Physical Chemistry Chemical Physics, 15(27), 11494-11500. (2013).

Wood III, D. L., Chlistunoff, J., Majewski, J., & Borup, R. L. "Nafion structural phenomena at platinum and carbon interfaces." Journal of the American Chemical Society, 131 (50), 18096-18104. (2009).

Niu, Zhiyin, et al. "Manipulation of PEDOT: PSS with Polar and Nonpolar Solvent Post-treatment for Efficient Inverted Derovskite Solar Cells." ACS Applied Energy Materials 3.10, 9656-9666. (2020).

Oh, K. H., & Bae, I. "Engineered Membrane-Electrode Interface for Hydrocarbon-Based Polymer-Electrolyte-Membrane Fuel Cells via Solvent-Vapor-Annealed Deposition." ACS Applied Nano Materials, 2(6), 3857-3863. (2019).

Gotrik, K. W., Hannon, A. F., Son, J_ G., Keller, B., Alexander-Katz, A., & Ross, C. A. "Morphology control in block copolymer films using mixed solvent vapors." ACS nano, 6(9), 8052-8059. (2012).

Castelino, P., Jayarama, A., Bhat, S., Fernandes, P., Prabhu, S., Duttagupta, S., Pinto, "Role of UV irradiated Nafion in power enhancement of hydrogen fuel cells." International Journal of & Hydrogen R. Energy, 46(50), 25596-25607. (2021).

Zhou, B., Pu, H., Pan, H., & Wan, D. "Proton exchange membranes based on semi-interpenetrating polymer networks of Nafion® and poly {vinylidene & fluoride) via radiation crosslinking." International journal of hydrogen energy, 36(11 ), 6809-6816. (2011).

Lue, S. J., Shiang-Yiaw H., and Ta-Chin W. "Surface modification of perlluorosulfonic acid membranes with perlluoroheptane {C7F16)/argon plasma." Journal of Membrane Science 305.1-2 (2007): 226-237.

International Search Report dated Aug. 22, 2023, which issued in related PCT application No. PCT/EP2023/064872, filed Jun. 2, 2023, 4 pages.

NPL_International Search Report dated Sep. 4, 2023 for related PCT Application No. PCT/EP2023/064934. 4 pages.

* cited by examiner

STABILIZED CATALYST LAYERS VIA CONTROLLED CRACKING

TECHNICAL FIELD

The present disclosure relates to catalyst layers such as cathode catalyst layers for electrochemical cells such as fuel cells and/or electrolyzers.

BACKGROUND

Catalyst layers such as cathode catalyst layers are used in electrochemical cell such as fuel cells and/or electrolyzers. For example, catalyst layers may be used in polymer electrolyte membrane fuel cells (PEMFCs).

SUMMARY

A catalyst layer is disclosed. The catalyst layer includes a catalyst composite having a catalyst, a catalyst support, and an ionomer matrix. In a refinement, the catalyst is deposited on the catalyst support and the catalyst support may be dispersed in the ionomer matrix. The catalyst composite may have a plurality of microcracks. The plurality of microcracks may have an average length of no more than 10 μm, an average width of no more than 5 μm, and/or an average max depth that is less than the depth of the catalyst composite. The plurality of microcracks may account for 1.5 to 20% of the total area of a cross-section of the catalyst composite.

In a variation, the plurality of microcracks may form a predetermined pattern. The pattern may be formed by a first series of cracks in a first direction and a second series of cracks in a second direction. The first and second series of cracks being from the plurality of microcracks. The first direction may be different than the second direction by at least 30 degrees. In a refinement, the plurality of microcracks may be present prior to electrochemical and/or humidity cycles. In one or more embodiments, the catalyst composite may have a first section and a second section. The first section may have a first crack density and the second section may have a second crack density. In a refinement, the second crack density may be greater than the first crack density. In another refinement, the plurality of microcracks may include a first group of cracks and a second group of cracks of a different size. For example, the first group of cracks may have a first average max depth and the second group of cracks may have a second average max depth that is less than the first average max depth. The first group of cracks may be disposed at a first region of an electrode from the pair of electrodes and the second group of cracks may be disposed at a second region of the electrode. The first group may be disposed proximate the inlet and the second group may be disposed proximate the outlet.

An electrochemical cell is disclosed. The electrochemical cell may include a pair of electrodes, an electrolyte membrane disposed between the pair of electrodes, an inlet, and an outlet. The pair of electrodes may include a catalyst layer. The catalyst layer may include a catalyst composite having a catalyst, a catalyst support, and an ionomer matrix. In a refinement, the catalyst is deposited on the catalyst support and the catalyst support may be dispersed in the ionomer matrix. The catalyst composite may have a plurality of microcracks. In one or more embodiments, the catalyst composite may have a first section and a second section. The first section may have a first crack density and the second section may have a second crack density. In a refinement, the second crack density may be greater than the first crack density. The inlet may be configured to receive a reactant such as oxygen and contact it with one of the pair of electrodes. The first section may be proximate to the inlet. The outlet may be configured to release an exhaust and the second section may be proximate the outlet. In a refinement, the electrochemical cell may include a bipolar plate having ribs and channels. The first section may mirror the channels and the second section may mirror the ribs. In still another refinement, the plurality of microcracks may form a crack density gradient.

An electrode/catalyst layer is also disclosed. The electrode/catalyst layer may include an ionomer matrix, a catalyst support, a catalyst, and an inert additive. The catalyst may be supported by the catalyst support and the catalyst support may be dispersed in the ionomer matrix. The inert additive may be configured to suppress cracking. In a variation, the inert additive may be ultrafine silica and/or zirconia oxide. In a refinement, the inert additive (e.g., ultrafine silica and/or zirconia oxide) may be present in an amount of 1.0 to 50 wt. % of the electrode/catalyst layer.

A method of preparing a catalyst layer is also disclosed. The method includes providing a catalyst supported on a catalyst support, dispersing the catalyst and catalyst support in one or more solvents to form a dispersion, adding a binder such as an ionomer binder to the dispersion to form a catalyst ink with the catalyst dispersed therein, inhibiting macrocracks, and forming a catalyst composite/layer from the catalyst ink. In a refinement, inhibiting macrocracks may include inducing microcracking in the catalyst composite. The microcracks may be created by applying a mechanical stress. In a variation, the mechanical stress may include bending and/or vibration. The mechanical stress applied to a first region of the catalyst composite may be different than the mechanical stress applied to a second region of the catalyst composite. In a refinement, the catalyst composite may be rolled about a roller along a first axis of the catalyst composite. The catalyst composite may also be rolled about a roller along a second axis of the catalyst composite that is different than the first axis. The microcracks may form a predetermined pattern.

In another variation, the microcracks may be induced by rapid evaporation the one or more solvents. In yet another variation, the catalyst ink may be applied to a microtextured substrate. The microtextured substrate may induce microcracking in a predetermined pattern. The still another variation, the microcracks may be induced by adding a removable additive to the catalyst ink before forming the catalyst composite and removing the removable additive such as by thermal decomposition or liquid extraction. In a further embodiment, the microcracks may be induced by flash freezing.

In another variation, the step of inhibiting macrocracks may include adding an inert additive such as ultrafine silica and/or zirconia oxide to the catalyst ink.

DETAILED DESCRIPTION

Embodiments of the present disclosure are described herein. It is to be understood, however, that the disclosed embodiments are merely examples and other embodiments can take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word about in describing the broadest scope of the invention. Practice within the numerical limits stated is generally preferred. Also, unless expressly stated to the contrary: percent, "parts of," and ratio values are by weight. The term "polymer" includes "oligomer," "copolymer," "terpolymer," and the like. The description of a group or class of materials as suitable or preferred for given purpose in connection with the invention implies the mixtures of any two or more of the members of the group or class are equally suitable or preferred. Molecular weights provided for any polymers refers to number average molecular weight. Description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially," "generally," or "about" may be used herein to describe disclosed or claimed embodiments. The terms "substantially," "generally," or "about" may modify a value or relative characteristic disclosed or claimed in the present disclosure to signify within manufacturing tolerances and/or within ±0%, 0.1%, 0.5%, 1%, 2%, 3%, 4%, 5% or 10% of the value or relative characteristic.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1 to 2.1 the following numbers 1.2, 1.3, 1.4, 1.5, 1.6, 1.7, 1.8, 1.9, and 2.0 can be selected as lower or upper limits.

Figure 1:
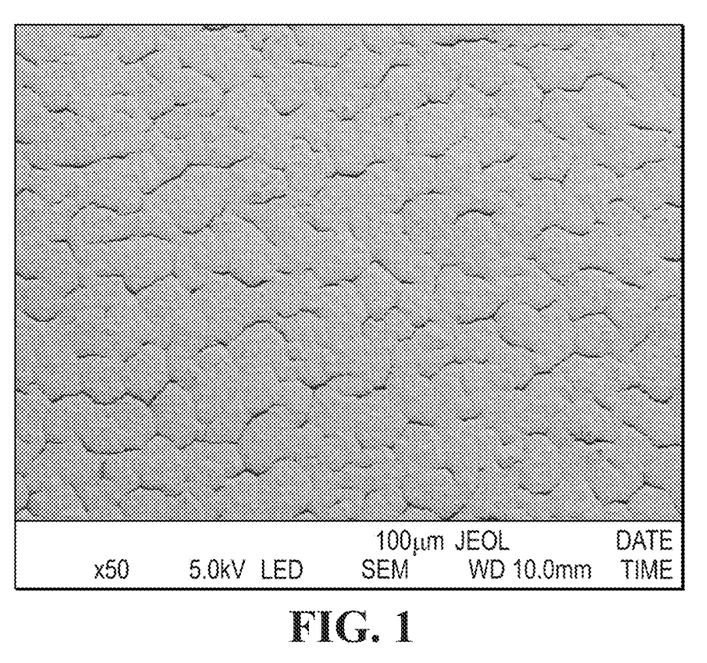
FIGS. 1-2 are top views of macrocracks in a catalyst composite/layer.
Figure 2:
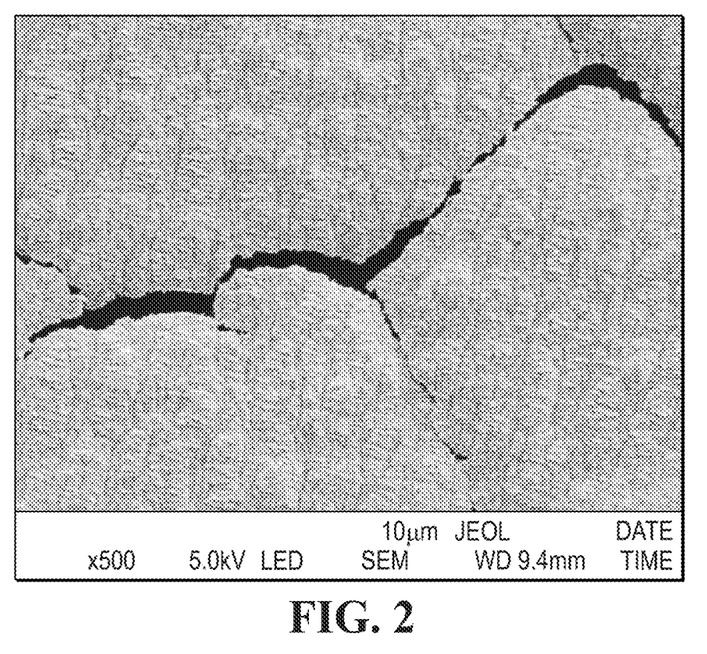

Traditionally, cracks are considered undesirable defects that are avoided. Cracks may be the result of specific chemistries, poorly formulated compositions, poor fabrication, inadequate deposition, and/or improper processing. Macrocracks may develop from these deficiencies and may be visible by sight. Macrocracks may be in the order of hundreds of micrometers long and in order of tens of micrometers wide (e.g., at least 50 µm long and at least 10 µm), as shown in FIGS. 1-2. FIG. 1 is a catalyst layer having macrocracks and FIG. 2 is a zoomed in view of an undesirable macrocrack. Severe cracks may even extend completely through the catalyst layer exposing the polymer electrolyte membrane. Generally, cracks will be present upon formation/post-processing of the of catalyst composite/layer 100. Over time cracks will propagate into larger cracks. Alternatively, cracks may not form immediately, i.e., the catalyst layer may appear crack-free, but cracks may appear after minor or limited use such as 5 hours, 10 hours, 50 hours, 80 hours, or 100 hours of use and propagate into larger and more severe cracks throughout use.

These cracks may lead to chemical and mechanical stresses. For example, cracks may create hydrophilic domains where water may collect and pool. This flooding, excessive hydration, and/or hydration swings of the membrane and/or catalyst layer is undesirable. These pools or reservoirs also collect and aggregate contaminants and degraded species. These undesirable materials may lead to degradation, inefficiencies, and/or failure as the cell ages. Contraction, and expansion (e.g., swelling) at or near the cracks may lead to additional degradation on the membrane layer below the catalyst layer. For example, pinholes or shorts may develop. This may lead to accelerated degradation, reversed potentials, efficiency losses, and/or catastrophic failures. Conventionally, high oxygen permeable ionomers (HOPIs) and low equivalent weight ionomers have more severe cracking issues than Nafion-based layers, although Nafion-based layers are not without issue.

Figure 3:
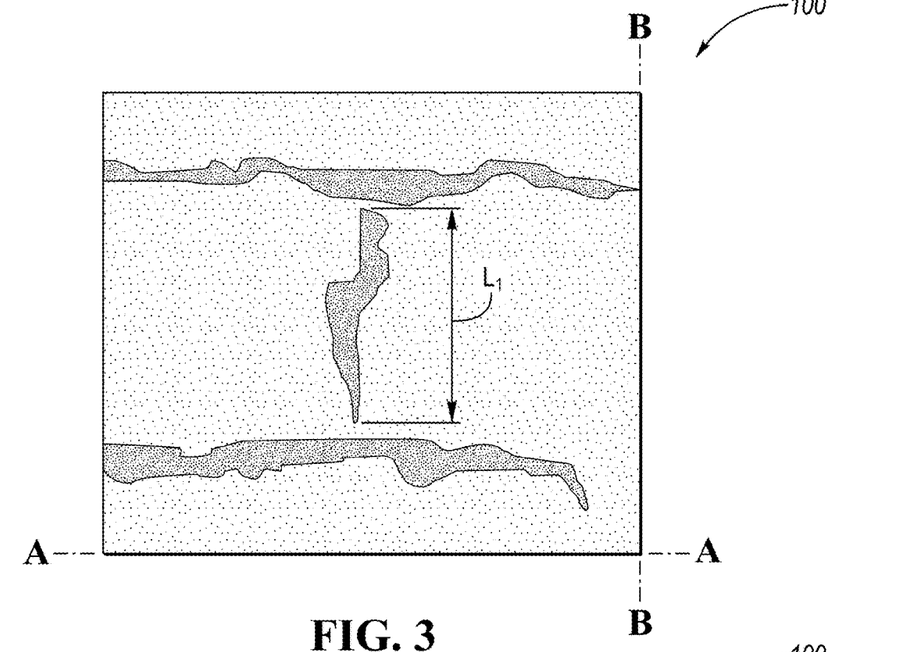
FIG. 3 is a top schematic view of a catalyst composite/layer having microcracks.
Figure 4:
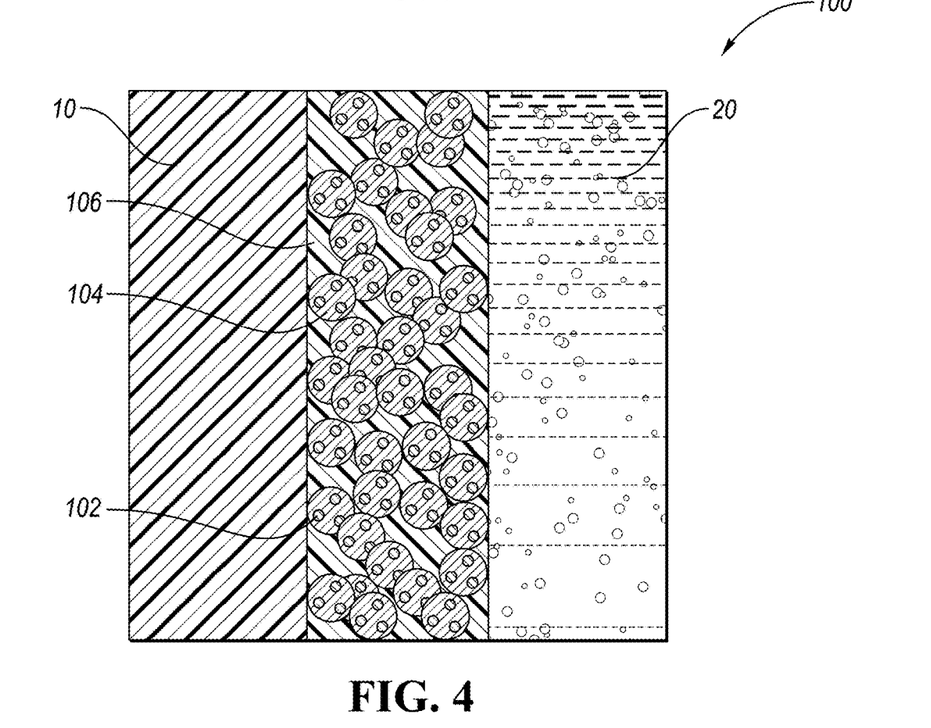
FIG. 4 is a cross-sectional schematic view of a portion of a catalyst composite/layer disposed in a fuel cell.
Figure 5:
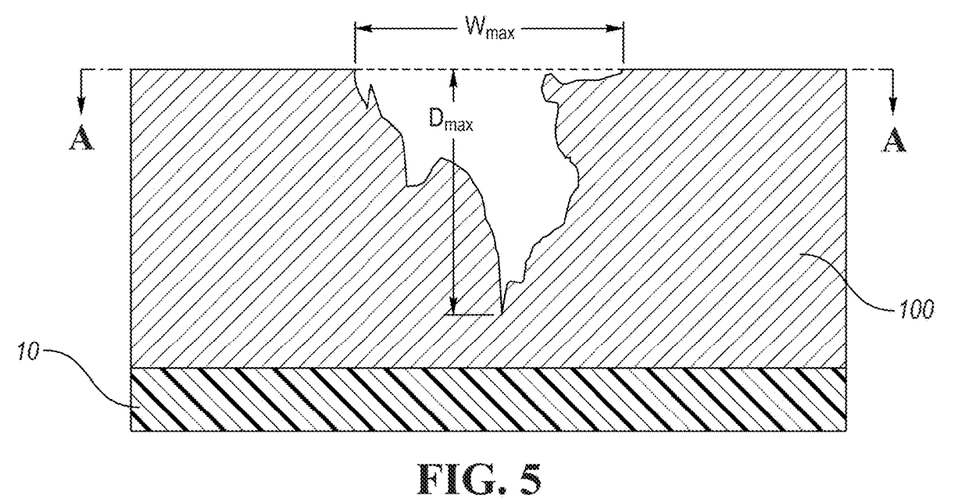
FIG. 5 is a cross-sectional schematic view of a portion of a catalyst composite/layer having a microcrack.

Referring to FIGS. 3-5, a microcracked catalyst composite/layer 100 is disclosed. The catalyst composite/layer 100 may be used in an electrochemical cell such as a fuel cell or electrolyzer. For example, the electrochemical cell (e.g., a fuel cell such as a proton-exchange membrane fuel cell or electrolyzer) may include a pair of electrodes (e.g., a cathode and an anode), and an electrolyte 10 such as a proton-exchange membrane in contact with and disposed between the electrodes. The electrodes may include one or more catalyst composites/layers and a gas diffusion layer 20. The catalyst composite/layer 100 may include a catalyst 102 supported by and/or deposited on a catalyst support 104. The catalyst 102 and catalyst support 104 may be in contact with and/or dispersed in an ionomer 106.

The catalyst 102 may be any suitable catalyst such as platinum, iridium, nickel, noble metals, other precious metals, platinum group metal (PGM) free doped carbon, and alloys or combinations thereof. For example, a platinum alloy with cobalt, nickel, iron, copper, gold or a combination thereof2. The catalyst may be of a form that increases its surface area to improve its activity. For example, a platinum powder may be used. The powder may have an average particle size of no more than 30 nm, or more preferably no more than 15 nm, or even more preferably no more than 10 nm. For example, the average particle size may be 0.1 to 30 nm, or more preferably 0.25 to 15 nm, or even more preferably 0.5 to 10 nm. In a refinement, the catalyst particles may be porous.

Catalyst support 104 may be any suitable materials for supporting and/or depositing the catalyst 102. The support 104 may be electronically conductive. For example, the catalyst support may be a metal oxide or a carbon-based material such as a carbon powder, fiber, sheet, paper, and/or cloth. In a refinement, the support 104 may be porous to increase its surface area such as high surface area carbons (HSCs). The catalyst may be deposited on carbon particles. For example, the support may include particles having a particle size (or average particle size) of 0.1 to 40 µm, or more preferably 0.5 to 30 µm, or even more preferably 1 to 20 µm. In a variation, the support particles may have pores with a minimum diameter of 0.5 to 25 nm, or more preferably 1 to 12, or even more preferably 2 to 8 nm and a depth of 0.5 to 30 nm, or more preferably 1 to 16, or even more preferably 2 to 10 nm. In another embodiment, these size may refer to the average pore size.

The ionomer matrix may be formed from a polymer and/or binder having ionic groups suitable for transporting ions. In one or more embodiments, the ionomer may serve as the electrolyte and/or facilitate ion transport. The ionomer may be highly hydrophilic because of the ionic nature. For example, the ionomer may be Nafion, a Nafion-based material, a polyfluoropolymer such as polytetrafluoroehtylene (PTFE), a low equivalent weight ionomer, and/or a high oxygen permeable ionomer (HOPI).

In one or more embodiments, the catalyst composite/layer 100 may have a plurality of microcracks. In a refinement, the catalyst composite/layer 100 may be free of macrocrack or substantially free of macrocracks. Microcracks may act as a primary or additional pathway/passage to transport reactants such as oxygen to the catalyst. These microcracks may improve the efficiency of the chemical reactions catalyzed or facilitated by the catalyst. Without the microcracks the reactant would need to travel by diffusion through the porous carbon. In a variation, the microcracks may facilitate and/or maintain high fluxes of oxygen needed for high power/current operations. In a refinement, the cracks may provide new or more accessible regions of local porosity (i.e., islands) that reduce or alleviate oxygen transport resistance which may inhibit or hinder high power/current operation. Microcracks may also mitigate macrocrack formation, growth, and propagation by providing a more robust structure for dealing with chemical and mechanical stresses. Unlike macrocracks, microcracks may be less susceptible to pooling, flooding, and/or excessive hydration.

In a refinement, the microcracks may refer to cracks having a length Li (or average length), as shown in FIG. 3, of no more than 10 µm, or more preferably no more than 5 µm, or even more preferably no more than 3 µm, or still even more preferably no more than 1 µm. In a variation, microcracks may have a length (or average length) of 0.1 to 10 µm, or more preferably 0.25 to 5 µm, even more preferably 0.5 to 3 µm, or still more preferably 0.55 to 1 µm.

In another refinement, the cracks may have a max width $W_{max}$ (or average max width), as shown in FIG. 5, of no more than 3 µm, or more preferably no more than 1 µm, or even more preferably no more than 0.75 µm. For example, the max width $W_{max}$ (or average max width) may be 0.1 to 3 µm, or more preferably 0.25 to 1 µm, or even more preferably 0.5 to 0.75 µm.

In one or more embodiments, the cracks may have a max depth $D_{max}$ (or average max depth) of no more 90%, 75%, 60%, 50%, 40%, or 25% of the thickness of the catalyst composite/layer 100. For example, the max depth $D_{max}$ may be 10 to 90% of the thickness of the catalyst composite/layer 100, or more preferably 20 to 80%, or even more preferably 30 to 60%. For example, for a catalyst composite/layer 100 having a thickness of 5 µm the max depth $D_{max}$ of the crack may be 0.5 to 4.5 µm, or more preferably 1 to 4 µm, or even more preferably 1.5 to 3 µm whereas a 25 µm catalyst composite/layer 100 may have cracks with a max depth $D_{max}$ of 2.5 to 22.5 µm, or more preferably 5 to 20 µm, or even more preferably 7.5 to 15 µm. However, it should be understood that catalyst composites/layers can have various thickness, for example, PGM-free catalyst may be in the order of hundreds of micrometers thick. In a refinement, the max depth $D_{max}$ may be a depth such that the remaining thickness $T_R$ of a solid or monolithic portion of the catalyst composite/layer 100 is present adjacent the membrane. For example, the remaining thickness $T_R$ may be at least 0.5 µm, or more preferably at least 0.75 µm, or even more preferably at least 1 µm. Alternatively, the crack may be completely through, i.e., 100% through the catalyst composite/layer 100.

In some embodiments, the catalyst composite/layer 100 may be free of macrocracks. In a variation, the catalyst composite/layer 100 may be free of cracks having a length 100 µm or more, or more preferably 50 µm or more, or still more preferably 25 µm or more. In a refinement, the catalyst composite/layer 100 may be free of cracks having a width of 25 µm or more, or more preferably 10 µm or more, or even more preferably 25 µm or more. In still other embodiments, the catalyst composite/layer 100 may be free of cracks having a depth of 100%, or more preferably 95% or more, or even more preferably 90% or more of the thickness of the catalyst composite/layer 100.

In one or more embodiments, the density of microcracks may be sufficient to facilitate transport of reactants to the catalyst such that efficiency is improved and/or oxygen transport resistance is reduced. For example, there may be at least 10 microcracks, or more preferably at least 25 microcracks, or even more preferably at least 50 microcracks. In a variation, there may be at least 5 microcracks per square inch, or more preferably at least 10 microcracks per square inch, or even more preferably at least 25 microcracks per square inch. In a refinement, the cracks may account for 1.5 to 25%, or more preferably 3 to 18%, or even more preferably 5 to 10% of the area of 2-D plane corresponding to the top surface of the catalyst composite/layer as shown by axes A-A and B-B. the catalyst composite/layer 100. Amounts below this may have little or no improvement in oxygen transport. Amounts above this may reduce the overall catalyst activity, lead to degradation, reduce the true loading and ultimately impairs performance.

Figure 6:
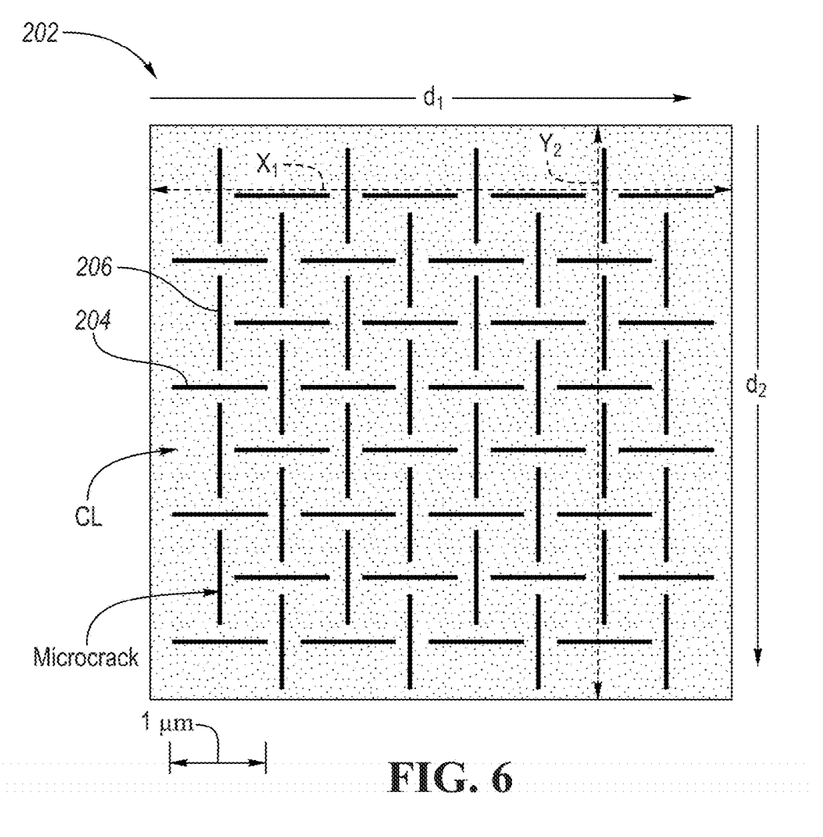
FIG. 6 is a schematic of an embodiment of a catalyst layer having patterned microcracks.

In one or more embodiments, as shown in FIG. 6, the cracks 202 may be patterned such as in a predetermined pattern. For example, a first series of cracks 204 may be generally aligned along a first axis $X_1$ in a first direction $d_1$, and a second series of cracks 206 may be aligned along a second axis $Y_1$ in a second direction $d_2$ such as in a hatch pattern (i.e., perpendicular or generally perpendicular). In a refinement, the first axis may be different than the second axis and the first direction may be different than the second direction. For example, the first axis/direction may be at least 25 degrees different than the second axis/direction, or more preferably at least 45 degrees, or even more preferably at least 60 degrees (i.e., form an angle that is at least 25/45/60 degrees). Patterns formed in this way may mitigate propagation.

A crack may refer to a split or breaking of the catalyst composite/layer 100. Cracks may be the result of chemical, electromagnetic radiation, and/or mechanical stress. Cracks, unlike cuts, may not be perfectly linear or curved. Instead, cracks may be jagged, or have minor/small changes in direction creating small turns or bends around minute corners as shown in FIG. 3. Alternatively, cracks may be induced by methods that provide more linear to straight splits.

In still another embodiment, the plurality of microcracks may be hydrophobically treated (e.g., non-polar annealing). Hydrophobic treatments are discussed in more detail in the application identified by Ser. No. 17/841,840 (RBPA0389PUS) and filed Mar. 16, 2022. Ser. No. 17/841,840 is hereby incorporated by reference in its entirety. For example, precision applications such as by coating or applying hydrophobicity on each, a majority, or a number of the microcracks via a needle may be achieved to counteract their hydrophilic nature and avoid pooling or over hydration. In a refinement, cracked regions may be hydrophobically treated and non-cracked regions may not be hydrophobically treated (i.e., untreated).

The catalyst composite layers described herein may be free of macrocracks for at least 500 hours, 1000 hours, 1500 hours, 2500 hours, and/or 5000 hours of operation unlike conventional catalyst composites/layers where macrocracks develop very quickly (i.e., within 0 hours, 5 hours, 10 hours, 50 hours, or 100 hours of operation) and propagate into larger cracks.

In another variation, the microcracked catalyst composite/layer 100 may be free of a protective coating that mitigates or eliminates the transmission of compounds such as reactants into the microcracks. In other words, the cracks may be open such that components such as reactants may travel into them. In a refinement, the catalyst support may not be coated with a barrier coating.

In yet another embodiment, the catalyst composite/layer 100 may be crack-free. The catalyst composite/layer 100 may include an ionomer matrix, a catalyst, a catalyst support and inert additive sufficient to prevent or suppress cracking. In a variation, the inert additive may be dispersed throughout the ionomer matrix. In a refinement, the inert additive may be a material that does not participate in chemical reactions and/or side reactions with the other components of the composition. The inert additive may reduce and/or inhibit mechanical stresses. For example, it may reduce and/or hinder contraction and/or expansion such as during drying. The inert additive may also reduce and/or dilute hotspots of catalyst or areas of disproportionately higher concentrations of catalyst which may be more susceptible cracking. In a variation, the inert additive may include silica and/or zirconium oxides may be used. The inert additive may also include free radical scavengers such as phenolic antioxidants, secondary antioxidants, cerium oxides, doped cerium oxides (e.g., zirconium doped cerium oxide), and/or manganese oxides. For example, ultrafine silica such as silica having an average particle size of less than 200 nm, or more preferably less than 60 nm, or even more preferably less than 20 nm. The ionomer matrix, catalyst, and catalyst support may be those as already described herein. In a refinement, the inert additive may be present in an amount of at least 1.0 wt. %, or more preferably at least 2.5 wt. %, even more preferably at least 5 wt. %, or still more preferably at least 10% of the total weight of the of the catalyst composite/layer 100. For example, the inert additive may be present in an amount of at least 1.0 to 50 wt. %, or more preferably 5 to 25 wt. %, or even more preferably 7.5 to 20 wt. % of the total catalyst composite/layer 100. In yet another refinement, a free radical scavenger may be added at 5 to 25% its recommended level for scavenging radicals to suppress cracking.

Figure 7:
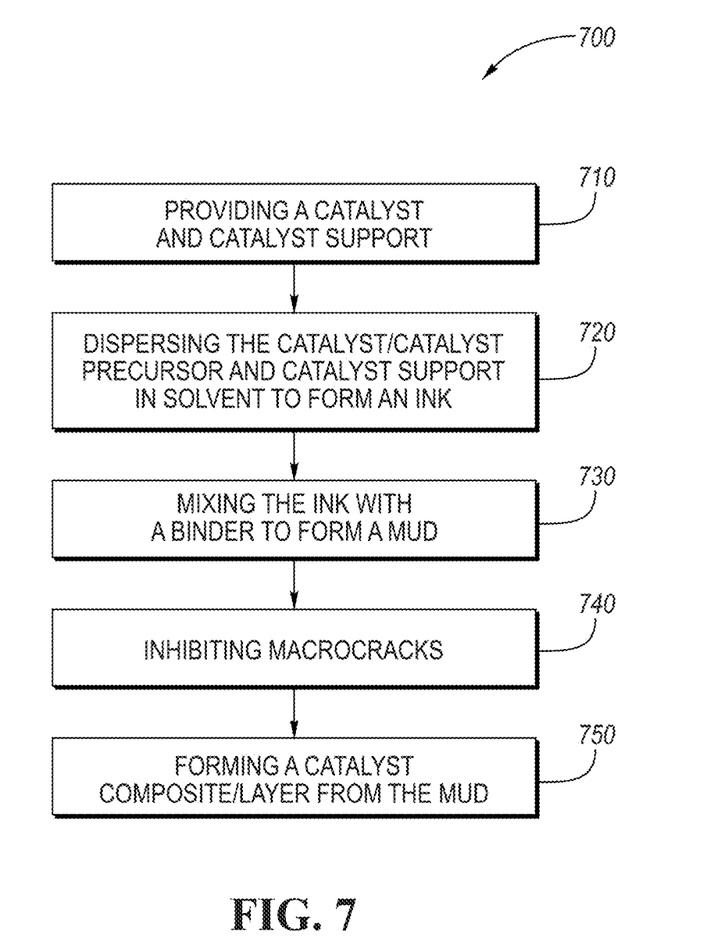
FIG. 7 is a flow chart illustrating a method of making a catalyst composite/layer.

A method 700 of preparing a catalyst composite/layer 100 is also disclosed. The method includes providing a catalyst supported by a catalyst support (i.e., step 710), dispersing the catalyst and catalyst support in a solvent to form a dispersion (i.e., step 720), adding and mixing a binder to the dispersion to form an ink (i.e., step 730), preventing, inhibiting, mitigating macrocracks, and/or inducing macrocrack inhibition (i.e., step 740) and forming a catalyst composite/layer from the ink (i.e., step 750).

In one or more embodiments, any suitable catalyst and catalyst support combination may be used (e.g., platinum on carbon). For example, platinum-carbon catalyst-catalyst support products may be available from Johnson Matthey such as B501018-5.

The catalyst and support may be dispersed in a solvent such as water and/or an organic solvent (e.g., an alcohol) to form a dispersion. A binder such as an ionomer binder may be added or incorporated and mixed into the dispersion to provide a catalyst ink. In a refinement, the ionomer binder may be part of a solution.

The ink may be shaped into a composite or layer and dried to form a catalyst composite or layer. In a refinement, an inert additive or removable additive may be added prior to the forming the composite. The inert additive as described herein may be used to provide a crack free catalyst composite/layer. A removeable additive may be used to induce microcracks. For example, a removeable additive may be a compound that can be thermally removed (e.g., by thermal decomposition), or low temperature removal techniques such as liquid extraction may also be used, e.g., some solid materials may easily dissolve into an organic solvent such that it is extracted leaving or inducing microcracks. For example, polyvinyl alcohol and/or butenediol vinyl alcohol copolymers may be incorporated into the composite or layer and removed by dissolving it in water. Microcracks may inhibit macrocracks by alleviating chemical and/or mechanical stresses.

Figure 8:
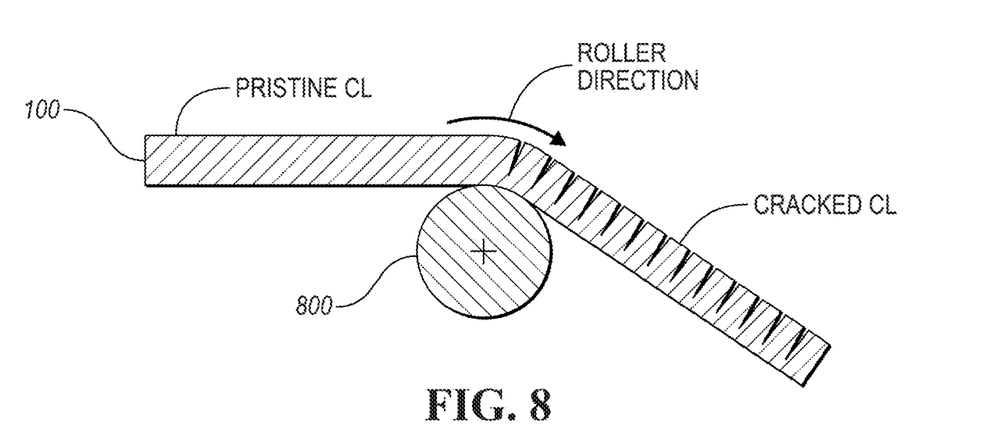
FIG. 8 depicts one method of applying mechanical stress to a catalyst composite/layer to induce microcracks.

Alternatively, or in combination, microcracks may be created by applying mechanical stresses to the catalyst composite/layer 100 after its formation. In a variation high-rate or rapid mechanical stressors may be applied. In one or more embodiments, these mechanical stresses may be applied such that microcracks in predetermined pattern are obtained. In a refinement, the catalyst composite/layer 100 may be bent such as bending it about a radius to induce microcracks as shown in FIG. 8. For example, stress may be applied by passing the catalyst composite/layer 100 over a roller 800 to provide mechanical stress that induces microcracks. When a uniform or consistent stress is applied predictable or patterned cracks may be obtained. Further, the size of the radius may be changed to adjust the severity of the cracks. For example, a smaller radius may provide deeper cracks and a larger radius may provide surface cracks that do not penetrate completely through the catalyst composite/layer 100 or as deep.

In another refinement, a first mechanical stress may be applied to induce microcracks along a first axis and/or in a first direction and a second mechanical stress may be applied to induce microcracks along a second axis and/or in a second direction. For example, the catalyst composite/layer 100 may be passed along the roller in a first direction and then turned such that it passes a roller in a second direction. The first and second directions may be different by at least 25 degrees, or more preferably at least 45 degrees, or even more preferably at least 60 degrees. For example, passing the catalyst composite/layer over a roller in first and second directions $d_1, d_2$ that perpendicular (i.e., 90 degrees different) may create a crosshatch pattern. In a variation, vibrations may be used apply mechanical stresses sufficient to induce patterned microcracks. For example, a vibrating steel drum roller may be used.

Figure 9:
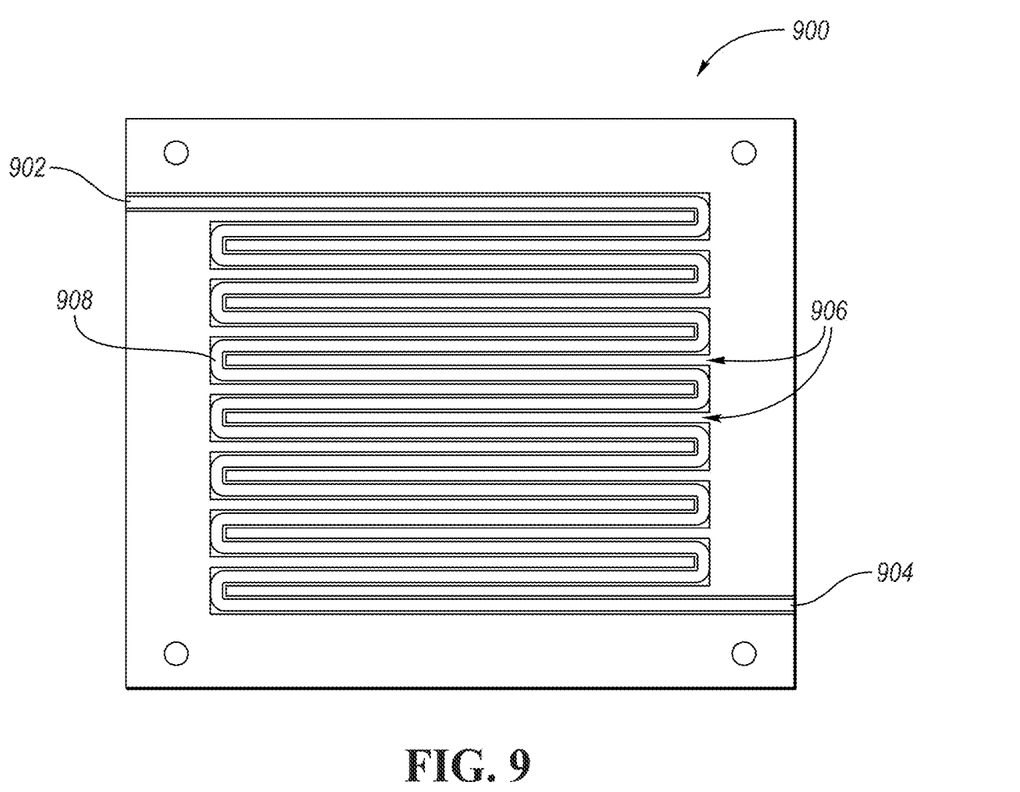
FIG. 9 is schematic view of a bipolar plate.

In still another refinement, the mechanical stress applied to different regions of the catalyst composite/layer may be different. This may alter the size or density of microcracks in different regions. For example, a first mechanical stress may be applied to a first region of the catalyst composite/layer (e.g., the inlet region) and a second mechanical stress may be applied to a second region of the catalyst composite/layer (e.g., the outlet region). The inlet region may be proximate or adjacent an inlet 902 such as the inlet 902 of a bipolar plate 900. The inlet 902 may be configured to receive a reactant such as oxygen and contact it with a catalyst of the electrode and the outlet region may be proximate or adjacent an outlet 904 such as that of the bipolar plate 900 configured to release an exhaust from the electrochemical reaction. In general, the region proximate the outlet 904 may be more starved of reactant than the region proximate the inlet 902. In a refinement, the second stress may be greater than the first stress such that there are more microcracks or larger microcracks. This may provide greater transport of reactants such as oxygen in the more starved outlet region. In another refinement, a gradient of stress may be applied to create gradients in microcrack density and/or size. For example, a gradient that increases crack density from the inlet region to the outlet region may be used. In yet another embodiment, a gradient where the average max depth of the cracks increases from the inlet region to the outlet region may also be achieved.

Alternatively, or in combination, microcracks may be induced by controlling the drying stage, i.e., the evaporation of solvents. In a refinement, rapid volatilization/evaporation may be used to induce microcracks. For example, a greater amount of microcracks and/or larger microcracks may be induced by more rapid evaporation. The rate of evaporation may be controlled by the solvents used, the air flow, the temperature, heating rate, surface area, the use of inert gases (e.g., nitrogen, helium, and/or argon), and/or humidity. Accordingly, increasing the temperature, using a greater air flow, applying a vacuum, and/or using solvents with greater evaporation rates may be used to provide greater and/or larger microcracks. In this manner evaporation can be controlled to determine the density and size of microcracks. The microcracks induced by rapid evaporation may appear more natural and/or random.

The catalyst composite/layer may also be applied to a microtextured substrate which may induce or facilitate microcracking. The substrate may be, for example, silicone and/or polytetrafluoroethylene (PTFE). The substrate may include a textured pattern for example, the substrate may have elevated/raised portions such that when stress is applied to the catalyst composite/layer via the substrate microcracking occurs in a pattern corresponding the raised and/or lowered portions. For example, the microtextured substrate may be vibrating to applying uniquely tuned stresses to the catalyst composite/layer. Alternatively, or in combination, the textured substrate may be applied at a specific pressure to induce microcracks in a pattern. For example, a microtextured roller may be used. In a variation, the microtextured substrate may have a pattern that mirrors the transport channels and land portions of a bi-polar plate that is intended to be proximate or adjacent the catalyst composite/layer. For example, microcracks may exist adjacent or proximate the land portions (e.g., ribs 906) of a bipolar plate 900. In another example, the portions adjacent/proximate the channels 908 of the bipolar plate 900 may have no, less, or smaller microcracks.

In another embodiment, flash freezing may be used to induce microcracking. For example, the catalyst composite/layer may be briefly exposed to water and frozen. The expansion of water during freezing may result microcracks. In a refinement, freeze and thaw cycles may be repeated a number of times to induce microcracking. For example, the catalyst composite/layer may be exposed to water such that it penetrates into the matrix and is thereafter frozen such as by liquid nitrogen. Upon freezing cracks may form effectively increasing the porosity for reactant transport.

While exemplary embodiments are described above, it is not intended that these embodiments describe all possible forms encompassed by the claims. The words used in the specification are words of description rather than limitation, and it is understood that various changes can be made without departing from the scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electrochemical cell comprising:
 a pair of electrodes, at least one of the pair of electrodes including a catalyst composite having an ionomer matrix, a catalyst support dispersed therein, and a catalyst supported by the catalyst support, the catalyst composite having a plurality of stress microcracks, a first section having a first crack density and a second section having a second crack density greater than the first crack density, the plurality of stress microcracks being splits or breaks in the catalyst composite;

an electrolyte membrane disposed between the pair of electrodes;

an inlet configured to receive a reactant and contact the reactant with one of the pair of electrodes, the first section being proximate to the inlet; and an outlet configured to release an exhaust, the second section being proximate to the outlet.

2. The electrochemical cell of claim 1, wherein the plurality of microcracks has an average length of no more than 10 μm.

3. The electrochemical cell of claim 2, wherein the plurality of microcracks has an average max width of no more than 5 μm.

4. The electrochemical cell of claim 3, wherein the plurality of microcracks has an average depth that is less than a depth of the catalyst composite.

5. The electrochemical cell of claim 1, wherein the plurality of microcracks form a predetermined pattern.

6. The electrochemical cell of claim 1, wherein the plurality of microcracks includes a first series of cracks in first direction and a second series of cracks in a second direction.

7. The electrochemical cell of claim 6, wherein the first direction is at least 30 degrees different than the second direction.

8. The electrochemical cell of claim 1, wherein the plurality of microcracks is present prior to electrochemical and/or humidity cycles.

9. The electrochemical cell of claim 1, wherein the plurality of microcracks accounts for 1.5 to 25% of a total area of a cross-section of the catalyst composite.

10. The electrochemical cell of claim 1, wherein the plurality of microcracks includes a first group of cracks having a first average max depth and a second group of cracks having a second average max depth that is less than the first average max depth, the first group of cracks being disposed at a first region of the at least one of the pair of electrodes and the second group of cracks being disposed at a second region of the at least one of the pair of electrodes.

11. The electrochemical cell of claim 10 further comprising a bipolar plate having ribs and channels, the ribs mirroring the second region and channels mirroring the first region.

12. The electrochemical call of claim 1, wherein the plurality of microcracks forms a crack density gradient.

13. The electrochemical cell of claim 1, wherein the plurality of microcracks are formed from chemical, electromagnetic radiation, and/or mechanical stress.

14. The electrochemical cell of claim 1, wherein each of the plurality of microcracks has jagged edges with changes in direction defining corners.

15. An electrochemical cell comprising:

a pair of electrodes, at least one of the pair of electrodes including a catalyst composite having an ionomer matrix, a catalyst support dispersed therein, and a catalyst supported by the catalyst support, the catalyst composite having a plurality of microcracks, a first section having a first crack density and a second section having a second crack density greater than the first crack density, each of the plurality of microcracks having jagged edges with changes in direction defining corners; and a bipolar plate having ribs and channels, the second section mirroring the ribs and the first section mirroring the channels.

16. The electrochemical cell of claim 1, wherein the electrochemical cell is a fuel cell or electrolyzer.

17. The electrochemical cell of claim 1, wherein the plurality of microcracks includes splits or breaks along the surface of the catalyst composite.

18. The electrochemical cell of claim 17, wherein the plurality of microcracks have a depth that is less than the composite layer such that a solid or monolithic portion of the composite layer is adjacent the electrolyte membrane.

19. The electrochemical cell of claim 15, wherein the plurality of microcracks are splits or breaks in the catalyst composite from chemical, electromagnetic radiation, and/or mechanical stress.

* * * * *